(12) United States Patent
Lin

(10) Patent No.: US 7,997,601 B2
(45) Date of Patent: Aug. 16, 2011

(54) ROLL-UP BICYCLE FENDER

(75) Inventor: Chong-Jiang Lin, Taichung County (TW)

(73) Assignee: Sunny Wheel Industrial Co., Ltd., Changhua County (TW)

( * ) Notice: Subject to any disclaimer, the term of this patent is extended or adjusted under 35 U.S.C. 154(b) by 215 days.

(21) Appl. No.: 12/501,431

(22) Filed: Jul. 12, 2009

(65) Prior Publication Data

US 2011/0006502 A1 Jan. 13, 2011

(51) Int. Cl.
*B62D 25/18* (2006.01)
*A47H 1/00* (2006.01)
*A47G 5/02* (2006.01)

(52) U.S. Cl. ........ 280/152.3; 280/852; 160/29; 160/242

(58) Field of Classification Search .................. 280/847, 280/152.1, 152.2, 152.3, 848, 851, 852, 159; 160/23.1, 24, 29, 242

See application file for complete search history.

(56) References Cited

U.S. PATENT DOCUMENTS

| | | | | | |
|---|---|---|---|---|---|
| 509,771 | A | * | 11/1893 | Shone | 280/152.3 |
| 544,935 | A | * | 8/1895 | Shone | 280/152.3 |
| 545,212 | A | * | 8/1895 | Snow | 280/152.3 |
| 590,980 | A | * | 10/1897 | Hall | 280/152.3 |
| 741,997 | A | * | 10/1903 | Beckwith | 280/152.3 |
| 868,461 | A | * | 10/1907 | Lockwood | 280/152.3 |
| 1,393,405 | A | * | 10/1921 | Soteros et al. | 160/31 |
| 3,313,337 | A | * | 4/1967 | Bernat | 160/24 |
| 5,121,935 | A | * | 6/1992 | Mathieu et al. | 280/152.3 |
| 5,205,332 | A | * | 4/1993 | Lii | 160/23.1 |
| 5,464,052 | A | * | 11/1995 | Wieczorek et al. | 160/23.1 |
| 5,562,296 | A | * | 10/1996 | Hall et al. | 280/152.3 |
| 5,700,022 | A | * | 12/1997 | Finnson | 280/152.3 |
| 5,716,070 | A | * | 2/1998 | Pearson | 280/852 |
| 6,367,832 | B1 | * | 4/2002 | Vogel | 280/152.1 |
| 6,991,019 | B2 | * | 1/2006 | Chang | 160/24 |
| 2004/0164540 | A1 | * | 8/2004 | Drummond | 280/851 |

* cited by examiner

*Primary Examiner* — John R Olszewski

(57) ABSTRACT

A roll-up bicycle fender is mounted on a frame pipe of a bicycle. A fender main body of the roll-up bicycle fender can be pulled out into an operative position to act as a fender to protect rider from dust, mud and road debris when in use, and can also be rolled up into a cylinder member when not in use.

11 Claims, 4 Drawing Sheets

ROLL-UP BICYCLE FENDER

BACKGROUND OF THE INVENTION

1. Field of the Invention

The present invention relates to a bicycle fender, and more particularly to a roll-up bicycle fender.

2. Description of the Prior Art

Nowadays, bicycling is one of the most popular recreations and sports activities, and has even become a daily transport means because of the fact that bicycling is not only environment friendly, good for health, easy to learn but also is suitable for all ages, sexes and figures. That's why the sales of bicycles increases and different kinds of peripheral products appear. The existing fenders, as one of the peripheral products of the bicycle, are mostly stereotyped and in the form a sheet member which is disposed close to the wheel to prevent the rider from getting splashed with mud or road debris. Furthermore, once the fenders are assembled on a bicycle, they will be difficult to disassemble.

The present invention has arisen to mitigate and/or obviate the afore-described disadvantages.

SUMMARY OF THE INVENTION

The primary object of the present invention is to provide a roll-up bicycle fender which can be pulled out when in use and rolled up when not in use.

To achieve the above object, a roll-up bicycle fender in accordance with the present invention comprises: a mounting device, a locking member and a fender assembly. The mounting device includes a mounting piece mounted on a bicycle. The locking member is pivotally disposed on the mounting piece. The fender assembly includes a cylinder member and a fender main body, the cylinder member is axially provided in its outer surface with a slot, the cylinder member is positioned in the locking member, the fender main body includes a laminate piece which has one end received in the cylinder member and has the other end extended out of the slot. The laminate piece can be pulled out into an operative position by pulling the other end of the laminate piece, and the fender assembly can also be pivoted to a position reduce the wind resistance of the bicycle when it is not in use.

DETAILED DESCRIPTION OF THE PREFERRED EMBODIMENT

The present invention will be clearer from the following description when viewed together with the accompanying drawings, which show, for purpose of illustrations only, the preferred embodiment in accordance with the present invention.

Figure 1:
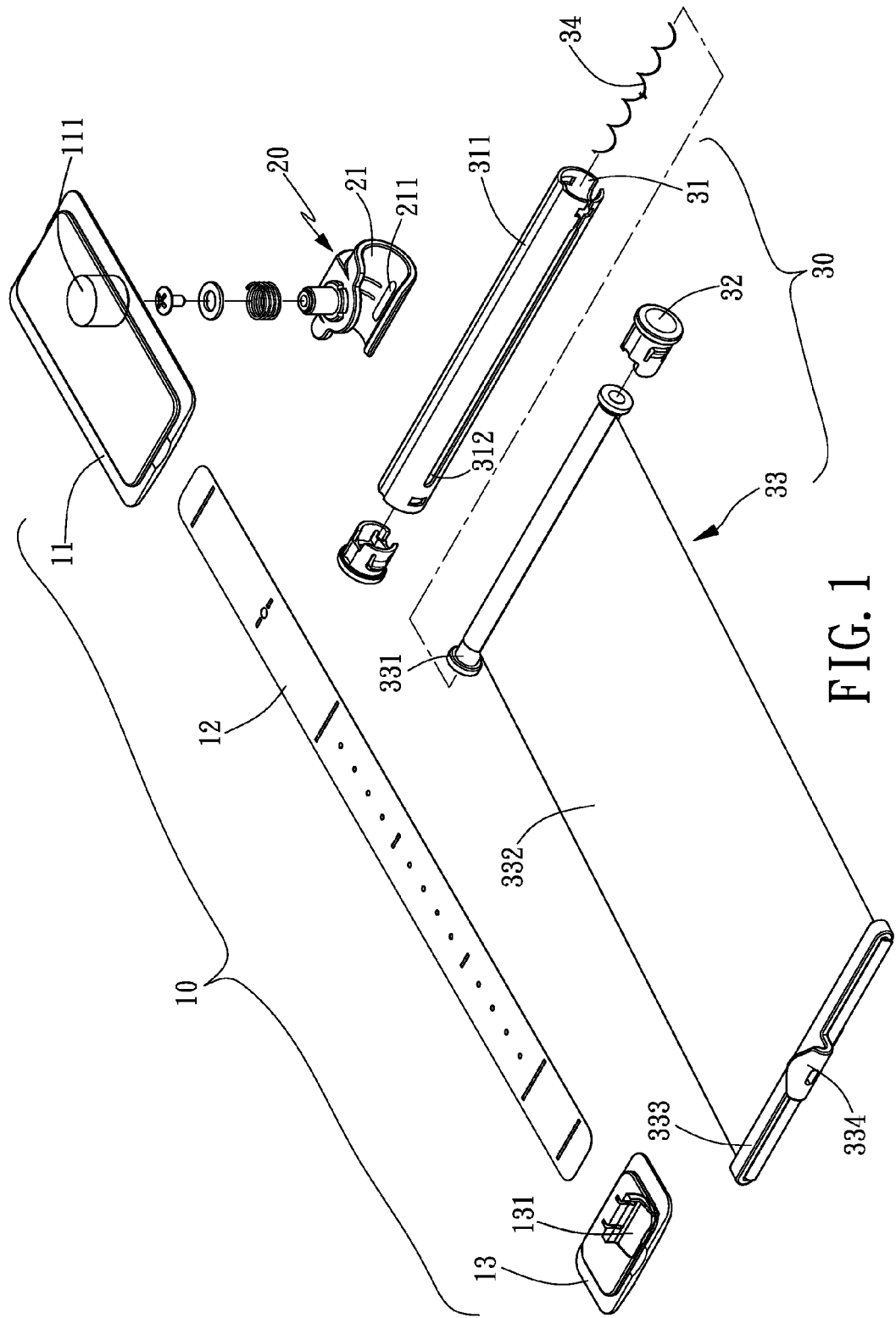
FIG. 1 is an exploded view of a roll-up bicycle fender in accordance with the present invention.
Figure 2:
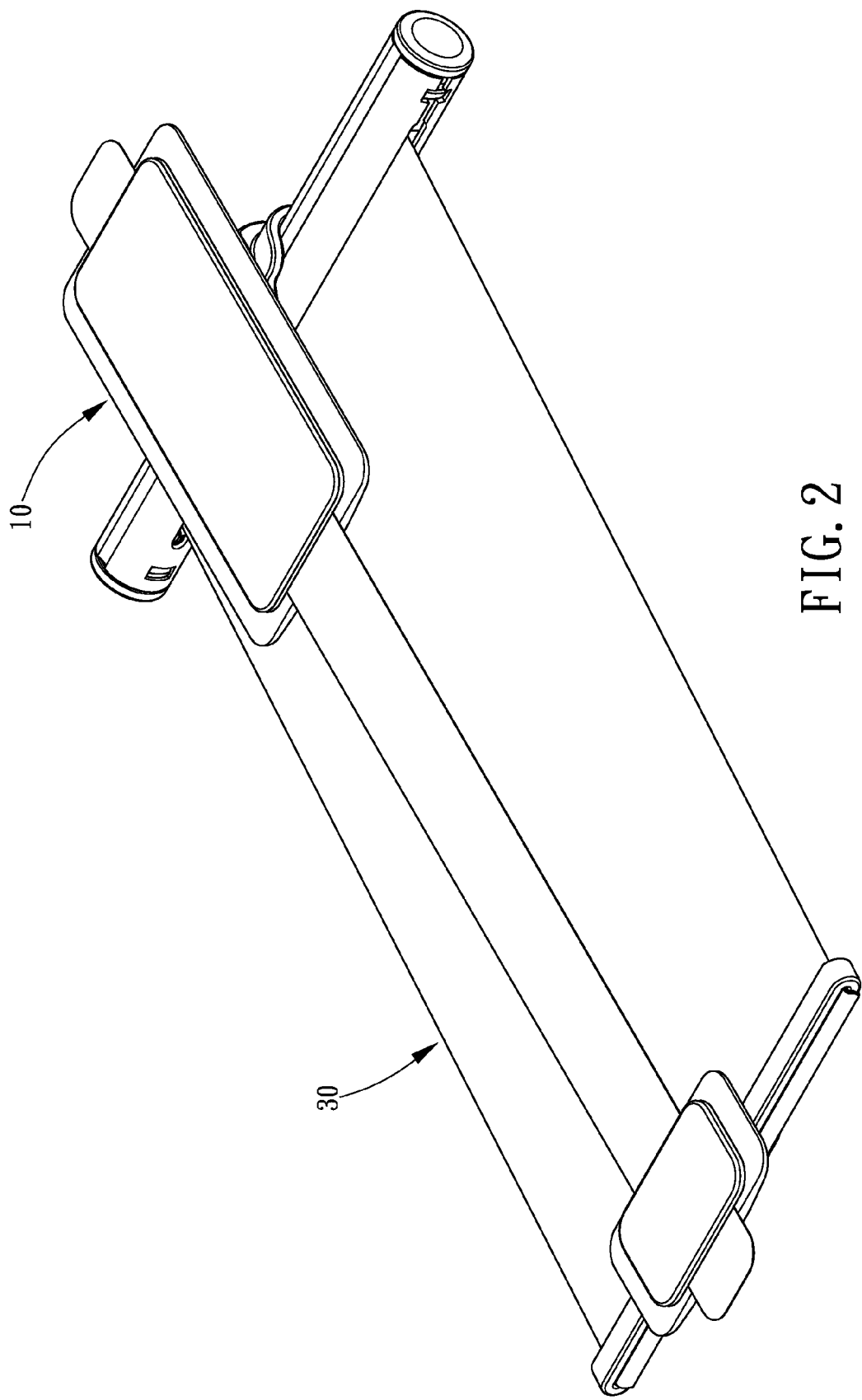
FIG. 2 is an assembly view of the roll-up bicycle fender in accordance with the present invention.
Figure 3:
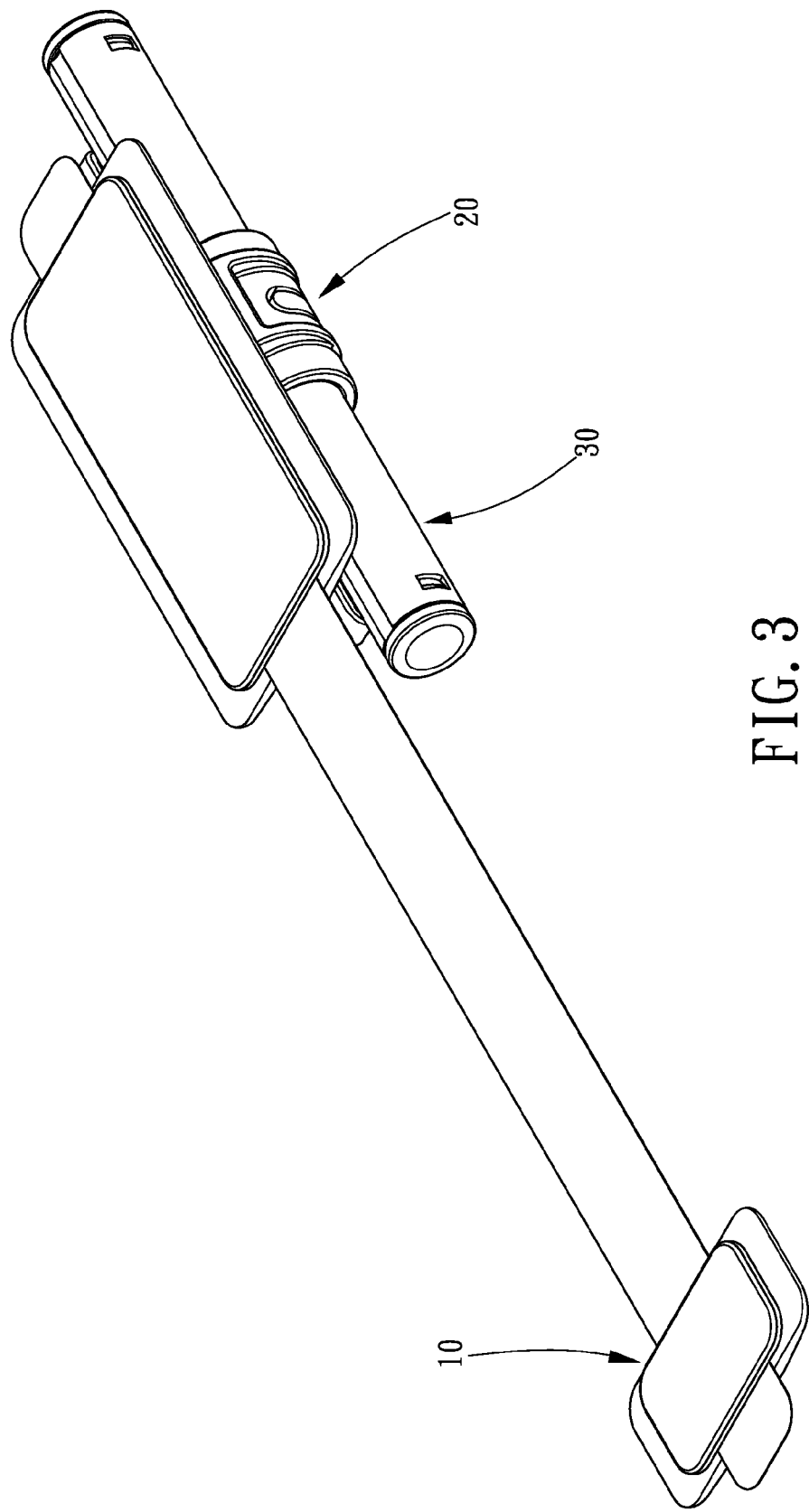
FIG. 3 shows an assembly view of the roll-up bicycle fender in accordance with the present invention, wherein the fender assembly is pivoted.
Figure 4:
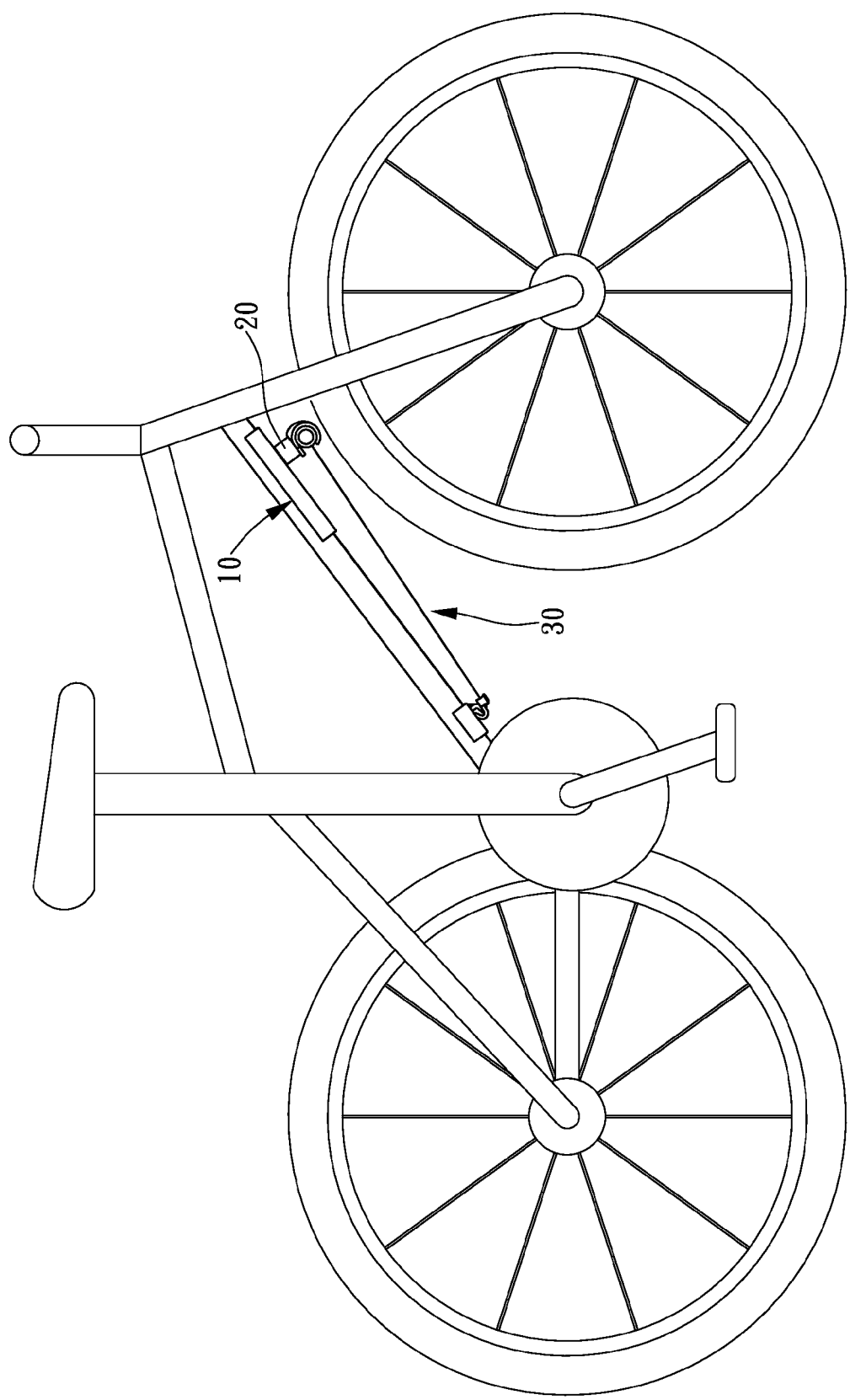
FIG. 4 shows that the roll-up bicycle fender in accordance with the present invention is mounted on a bicycle.

Referring to FIGS. 1-4, a roll-up bicycle fender in accordance with the present invention is mounted on a bicycle having a plurality of frame pipes and comprises: a mounting device 10, a locking member 20, and a fender assembly 30.

The mounting device 10 includes a mounting piece 11, an elongated piece 12 and a positioning piece 13. The mounting piece 11 is provided with a mounting portion 111. The elongated piece 12 has one end connected to the mounting piece 11 and the other end connected to the positioning piece 13. The positioning piece 13 has a hook portion 131, and the mounting piece 11 can be mounted on different shaped and sized pipes of a bicycle frame in a folded manner.

The locking member 20 is pivotally disposed on the mounting portion 111 of the mounting piece 11 and formed with a hook portion 21, and in the inner surface of the hook portion 21 is formed a positioning rib 211.

The fender assembly 30 includes a cylinder member 31, two end caps 32, a fender main body 33 and an elastic member 34. The cylinder member 31 includes two open ends covered by the two end caps 32 and is axially provided in its outer surface with an engaging groove 311 for engaging with the positioning rib 211 of the locking member 20 and a slot 312 which is communication with one open end of the cylinder member 31. The fender main body 33 includes a rotary shaft 331, a laminate piece 332 and a pull member 333. The laminate piece 332 is located between a rider and the wheels of the bicycle and has one end connected to the rotary shaft 331 and can be rolled up around it. The rotary shaft 331 is received in the cylinder member 31 in such a manner that the other end of the laminate piece 332, which a free end, extends out of the slot 312 of the cylinder member 31. The pull member 333 is fixed to the free end of the laminate piece 332 so as to make the free end of the laminate piece 332 stay outside the cylinder member 31 and to allow a user to pull out the laminate piece 332 by pulling the pull member 333. The pull member 333 is formed with a hook 334 which is to be hooked to the hook portion 131 of the positioning piece 13 after the laminate piece 332 is pulled out, so as to maintain the laminate piece 332 in a pulled-out position. The elastic member 34 has one end fixed to one of the end caps 32 and the other end connected to the rotary shaft 331. Pulling out the laminate piece 332 causes the rotation of the rotary shaft 331 and makes the elastic member 34 compress since the elastic member 34 will rotate along with the rotation of the rotary shaft 331. After releasing the laminate piece 332, the elastic member 34 will be decompressed and make the laminate piece 332 return to retracted state.

The mounting piece 11 and the positioning piece 13 can be folded or deformed to adapt to the frame pipe of the bicycle and then are fixed thereon by double adhesive tape or hook and loop tape, which allows the mounting device 10 to be fixed at any desired part of the bicycle. The fender assembly 30 is positioned on the locking member 20 through the engagement of the engaging groove 311 of the cylinder member 31 and the positioning rib 211. To use the fender assembly 30, the cylinder member 31 can be adjusted to make the slot 312 face toward the positioning piece 13 of the mounting device 10, and the laminate piece 332 is pulled out by pulling the pull member 333 of the fender main body 33 until the hook 334 of the pull member 333 is hooked to the hook portion 131 of the positioning piece 13, so that the laminate piece 332 is maintained in a pulled-out (operative) position without retracting into the cylinder member 31, and the pulled-out laminate piece 332 can serve as a fender to protect rider from dust, mud and road debris.

To roll up the fender assembly 30, the hook 334 of the pull member 333 can be detached from the hook portion 131 of the positioning piece 13, then the laminate piece 332 of the fender main body 33 will be retracted into the cylinder member 31 of the fender assembly 30 and rolled up around the rotary shaft 331 of the fender main body 33 in such a manner that the pull member 333 at the free end of the laminate piece 332 will be stopped outside the slot 312 of the cylinder member 31 to prevent the laminate piece 332 disappearing completely into to the cylinder member 31 and also to allow for easy pulling-out of the laminate piece 332 again when needed. When the fender main body 33 is changed from operative position to retracted position, the slot 312 of the cylinder member 31 still faces toward the positioning piece 13 of the mounting device 10 while the axial direction of the cylinder member 31 of the fender assembly 30 is different from the extension direction of the mounting device 10, which will increase the width of the fender. Hence, it will occupy a lot of space when the fender assembly 30 is not in use and will increase the wind resistance of the bicycle. At this moment, the locking member 20 can be rotated to adjust the axial direction of the cylinder member 31 of the fender assembly 30 to the extension direction of the mounting device 10, so as to reduce the width of the fender and the wind resistance caused by the fender assembly 30. Since the fender assembly 30 is detachably engaged in the locking member 20, when a bicycle is parked in an open space or somewhere the user can't see it, the user can remove the fender assembly 30 from the locking member 20 so as to prevent it from being stolen or exposed to the elements. Furthermore, the fender assembly 30 is easily portable since the laminate piece 332 of the fender main body 33 has been rolled up into the cylinder member 31. Or, if the mounting device 10 is mounted on the bicycle by loop and hoop tape, then the fender as a whole can be removed from the bicycle.

While we have shown and described various embodiments in accordance with the present invention, it is clear to those skilled in the art that further embodiments may be made without departing from the scope of the present invention.

What is claimed is:

1. A roll-up bicycle fender comprising:
a mounting device including a mounting piece mounted on one of frame pipes of a bicycle;
a locking member pivotally disposed on the mounting piece; and
a fender assembly including a cylinder member and a fender main body, the cylinder member being axially provided in its outer surface with a slot, the cylinder member is positioned in the locking member, the fender main body including a laminate piece which is located between a rider and wheels of the bicycle, the laminate piece having one end received in the cylinder member and the other end extended out of the slot, the rider can pull out the laminate piece by pulling the other end of the laminate piece;
when the laminate piece is rolled up and retracted into the cylinder member, an axial direction of the cylinder member of the fender assembly is allowed to be adjusted to reduce a wind resistance caused by the fender assembly.

2. The roll-up bicycle fender as claimed in claim 1, wherein the mounting device is mounted on one of the frame pipes.

3. The roll-up bicycle fender as claimed in claim 1, wherein the locking member is formed with a hook portion in which the cylinder member is engaged.

4. The roll-up bicycle fender as claimed in claim 3, wherein a positioning rib is formed on an inner surface of the hook portion of the locking member, and the cylinder member is axially provided in its outer surface with an engaging groove for engaging with the positioning rib of the locking member.

5. The roll-up bicycle fender as claimed in claim 1, wherein the fender main body further includes a rotary shaft, the laminate piece has the one end connected to the rotary shaft and is rolled up around it, and the rotary shaft is received in the cylinder member.

6. The roll-up bicycle fender as claimed in claim 5, wherein the fender assembly further includes an elastic member which has one end fixed to the cylinder member and the other end connected to the rotary shaft.

7. The roll-up bicycle fender as claimed in claim 1, wherein the fender assembly further includes two end caps which are disposed at both ends of the cylinder member.

8. The roll-up bicycle fender as claimed in claim 1, wherein the fender main body further comprises a rotary shaft, and the laminate piece is rolled up around the rotary shaft and received in the cylinder member.

9. The roll-up bicycle fender as claimed in claim 1, wherein the fender main body further includes a pull member which is disposed at the other end of the laminate piece to make the other end of the laminate piece stay outside the cylinder member.

10. The roll-up bicycle fender as claimed in claim 9, wherein the mounting piece of the mounting device is connected to a positioning piece which is defined with a hook portion, and the pull member is provided with a hook to be hooked to the hook portion of the positioning piece.

11. The roll-up bicycle fender as claimed in claim 1, wherein the mounting piece is provided with a mounting portion, an elongated piece has one end connected to the mounting piece and the other end connected to a positioning piece, and the locking member is pivoted to the mounting portion.

* * * * *